June 30, 1931.  R. H. JELLICOE  1,812,006
CHUCK
Filed Dec. 27, 1926  3 Sheets-Sheet 2

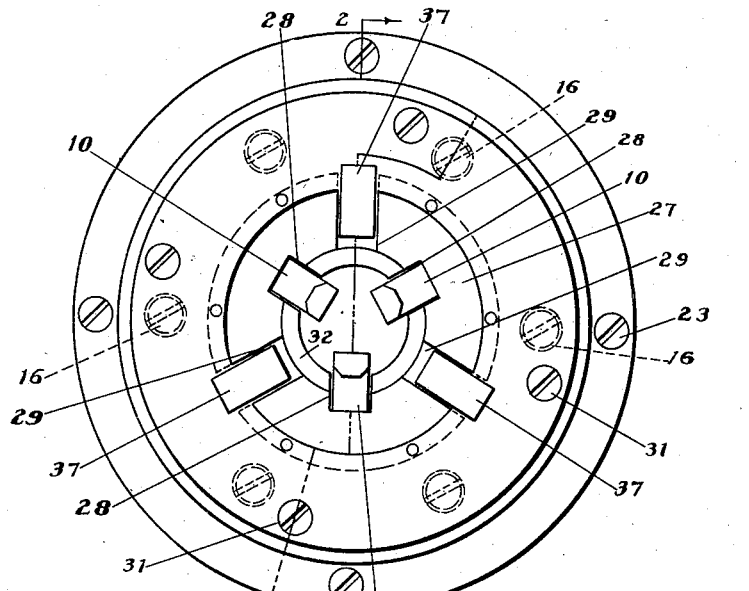
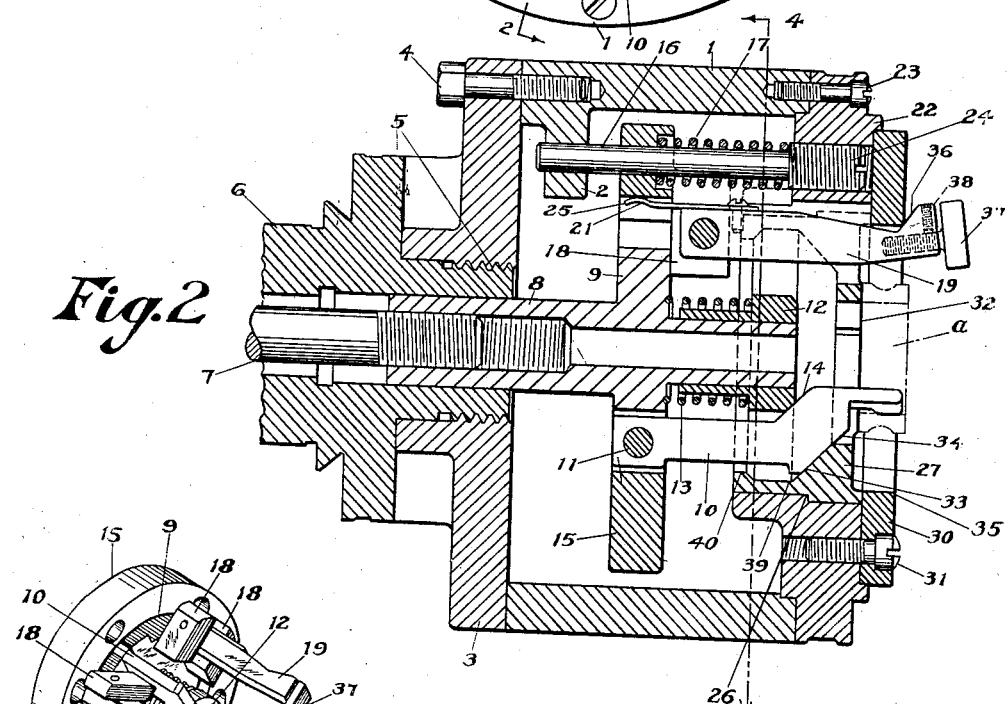

Inventor
Richard H. Jellicoe
By Geo. H. Kennedy Jr.
Attorney

Patented June 30, 1931

1,812,006

UNITED STATES PATENT OFFICE

RICHARD H. JELLICOE, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK

Application filed December 27, 1926. Serial No. 157,144.

The present invention relates to improvements in work holding devices or chucks,— more especially those adapted to hold annular or hollow workpieces in position to be operated upon interiorly by a tool, grinding wheel or the like.

The invention is particularly applicable to the chucking of annular or hollow workpieces whose bores or internal surfaces to be finished or operated upon, are already drilled, turned or rough-ground to true circles; according to the invention, each such workpiece successively presented to the chuck is automatically centered with reference to its bore, and held in such centered position, so that the operation of finishing said bore to a desired diameter can be accomplished with a minimum removal of stock. It is an easy matter then to bring the exterior surfaces of such workpieces into exact concentricity with said bores, by mounting the interiorly finished pieces on an arbor and turning or grinding down said exterior surfaces.

The invention, as hereinafter more fully described, provides two sets or series of work engaging fingers, namely a set or series of centering fingers on which each successive workpiece as presented to the chuck is impaled, and a set or series of workholding fingers which, after the workpiece has been centered, move into pressing engagement with one plane end surface of said workpiece, thereby to clamp the latter against an unyielding plane surface of the chuck; this action of closing the chuck effects removal of the centering fingers from the bore, leaving the latter free to be operated upon by a tool, grinding wheel, or the like. Furthermore, the clamping force is exerted endwise, and thus there is no radial distortion of the workpiece, such as might be produced, particularly in a thin-walled workpiece, by radial chuck jaws engaging its cylindrical outer surface. The attainment of the above and other objects of the invention will be more fully set forth hereinafter, with reference to the accompanying drawings, in which—

Fig. 1 is a view in front elevation of the work holding device or chuck of my invention.

Fig. 2 is a sectional view on the line 2—2 of Fig. 1, showing the chuck in open position.

Fig. 5 is an isometric view, on a smaller scale, of the two sets or series of chuck fingers.

Figure 4:
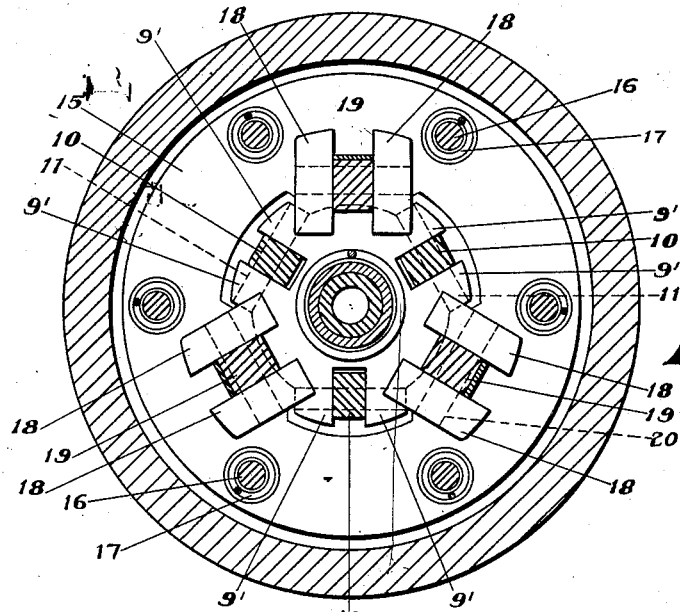
Fig. 4 is a sectional view on the line 4—4 of Fig. 2.

Like reference characters refer to like parts in the different figures.

Referring first to Figs. 1 to 5 inclusive, the two sets of work engaging fingers, together with their operating devices as hereinafter described, are preferably inclosed in a substantially cylindrical shell or casing 1, the latter, near its inner end, being provided with a plurality of interior bosses 2, 2, for a purpose to be subsequently set forth. Said shell 1 is fastened at its inner end to a plate 3 by means of bolts 4; said plate 3 is secured in any suitable way, as by the screw threads 5 to the end of a suitably journalled work rotating spindle or shaft 6, here shown as made hollow, for the longitudinal movement therein of a rod 7, adapted, when moved to the right, Figs. 2 and 3, to open the chuck, and when moved to the left, to close it. The construction, arrangement and operation of the parts which are operated by said rod 7 will now be set forth in detail.

Within the space inclosed by shell 1 is an elongated member 8, whose inner end, slidably received in the bore of shaft 6, has a screw threaded connection with rod 7, so that member 8 is moved by said rod. At an intermediate point in its length, member 8 provides a substantially circular enlargement 9, having three pairs of radially projecting ears 9', 9' for the pivotal attachment to said enlargement of the equally spaced work centering fingers 10, 10, 10, whose pivot pins 11 are journalled in said ears. Slidably mounted on the forward portion of member 8 is a sleeve 12 pressed yieldably outwardly by a spring 13, so that the bevelled edge of said sleeve 12 bears against inclined cam surfaces 14 on each of the fingers 10, thereby tending to spread or distend said fingers in response to the pressure of said spring 13. The other set of the fingers of the chuck, namely the work clamping fingers, are carried by an annular member 15 which is supported within the shell 1 independently of the member 8. Said member 15 finds its support on a circular series of rods or pins 16, 16, six in number, whose inner ends are carried by the bosses 2, 2 of shell 1, and whose outer ends are carried by an annular front plate 22 of the chuck shell, said plate 22 being held to the shell 1 by any suitable means, such as screws 23, 23. The rods 16 are preferably enlarged at their outer ends, as shown at 24, for screw threaded engagement with corresponding holes in the front plate 22. Said member 15 is adapted to slide on its supporting rods 16, 16, being urged rearwardly thereon by springs 17, 17, surrounding said rods and bearing against the front plate 22 of the shell 1. As best shown in Fig. 4, member 15 is provided on its front side with three pairs of lugs or ears 18, 18, for the pivotal support of the equally spaced clamping fingers 19, 19, 19, by means of pivot pins 20, extending between each pair of ears.

When the chuck is in open position, as shown in Fig. 2, (the rod 7 being thrust to the right) enlargement 9, by engagement of its front surface with the lugs or ears 18, 18 of member 15, holds said member 15 and its attached clamping fingers 19, 19, 19 in extreme right hand position, causing compression of the springs 17, 17 on rods 16, 16; under these conditions, the clamping fingers 19, 19, 19 are not only not operative, but they are held in extreme distended position, and entirely out of the way of the work being presented to the chuck, this last being accomplished by the action of leaf springs 21 projecting rearwardly from each finger and bearing, in each instance, against the bottom of a slot 25 in the inner periphery of member 15.

In setting up the chuck to receive and hold successive workpieces $a$ of a given internal diameter, means must be provided to adjustably limit the distension of the centering fingers 10, 10, 10, on which said workpieces are initially impaled, and which tend to spread under the action of sleeve 12 and spring 13. Such means is here shown as a member 27 which has an external diameter that fits the bore of the front plate 22 and which is shouldered externally to correspond to the internal shoulder 26 of said bore, which thus provides a seat for the member 27. The said member 27, has two sets of slots 28 and 29 for the passage through said member of the two sets of fingers 10 and 19, the inner slots 28 for the fingers 10 being equally spaced with reference to each other and with reference to the outer slots 29 for the fingers 19, as shown in Fig. 1. The member 27 is removably held in place, against any endwise movement with relation to the front plate 22 by an overlapping ring 30, detachably secured to said front plate by screws 31. The function of the member 27 in adapting the chuck to workpieces of different internal diameters will now be described:—

Each member 27 with which the chuck is equipped, provides at its innermost portion, adjacent to slots 28, a segmental front flange 32, adapted to form a backing, for the inner plane surface of the workpiece $a$ and to take the thrust of the clamping fingers 19, when the latter are engaged with the outer plane surface of said workpiece. The diameter of segmental flange 32 varies in different members 27 to correspond to workpieces of different size, as does also the height of an interior bevelled surface 33 of each member 27, which surface is adapted to cooperate with correspondingly bevelled surfaces 34 on each center finger 10. These surfaces 33, as will be seen, limit the distension of the fingers 10, and therefore, for any given size of workpiece to be held, that member 27 is chosen whose bevel surface 33 will sufficiently contract the fingers 10 so as to allow the workpiece to be readily slipped over them, as shown in Fig. 2,—the segmental flange 32 of the selected member 27 having, of course, a slightly greater internal diameter than the workpiece $a$.

Figure 3:
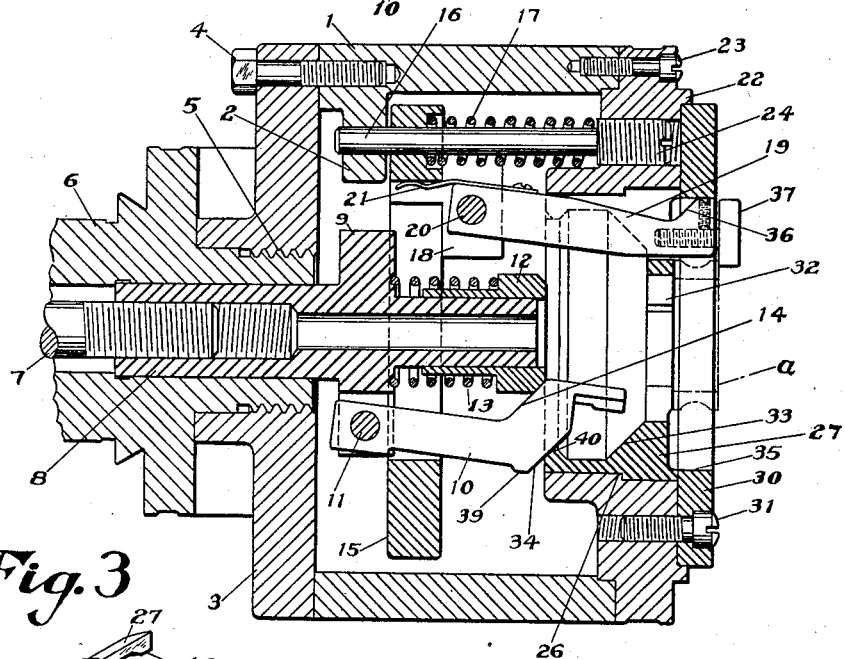
Fig. 3 is a view similar to Fig. 2, showing the chuck in closed position.
Figure 6:
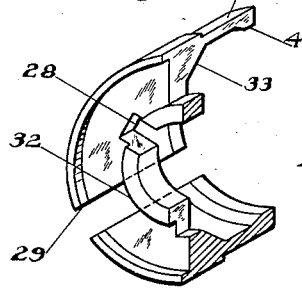
Fig. 6 is an isometric sectional view of the member 27.

The act of pushing the workpiece onto the fingers 10 automatically centers said workpiece, it being understood that this may involve a slight yielding of spring 13 in order to insure that the workpiece will be snugly held by said fingers. The chuck is now ready to be closed by movement of the rod 7 to the left; this movement, communicated to the enlargement 9, allows a corresponding movement of the member 15 under the influence of springs 17, thereby drawing in the clamping fingers 19 toward the workpiece. The movement of said fingers 19 is simultaneously to the left and inward toward the center, this last being due to the fact that the inner edge 35 of ring 30 cooperates with a bevelled or cam surface 36 on each of said fingers, to swing the latter inwardly about the pivot pins 20 as said pins are carried to the left; before the ends of the leftward moving centering fingers leave the bore of the workpiece, the clamping devices 37, carried by the ends of fingers 19, will have moved into the position shown in Fig. 3, where said devices 37 engage the plane front surface of workpiece a to press said workpiece against the segmental flange 32, to hold it firmly in place under the combined influence of the six springs 17. Said clamping devices 37 are preferably made adjustable in and out on the fingers 19, by means of their threaded shanks, which enter correspondingly threaded holes in said fingers and are adapted to be held in any desired position of adjustment by means of said screws 38. Continued leftward movement of rod 7, after the clamping devices 37 have been brought against the centered workpiece, withdraws the centering fingers 10 from the bore of said workpiece, said centering fingers ultimately reaching the position indicated in Fig. 3; as the fingers 10 pass out of the bore of the workpiece, they are maintained in parallelism and prevented from being thrust too quickly outward by sleeve 12, by the engagement of projections 39 on said fingers with an internal ledge 40 of member 27, but when this ledge is passed, the fingers are free to swing outwardly, as shown in Fig. 3, so as to assume positions where they cannot possibly be struck by a tool, grinding wheel or the like, operating in and through the bore of the workpiece a.

Upon the completion of the operation on the bore of workpiece a, to bring it to the desired finished size, the chuck operating rod 7 is moved to the right, in consequence of which the enlargement 9, as soon as it strikes the lugs 18, will effect the release of the finished workpiece from the clamping devices 37. This occurs just after the projection of the ends of centering fingers 10 past the segmental flange 32, so that the workpiece is re-engaged by said centering fingers before being released from the chuck. In this releasing movement, when the ends of the centering fingers 10, 10 strike the rear side of the workpiece a, the latter will either be pushed forward, with corresponding forward movement of clamping fingers 19, 19, or will be entered by said centering fingers 10, 10 before being released by said clamping fingers 19, 19. In either event in the return of said centering fingers to operative position (from the position shown in Fig. 3 to the position shown in Fig. 2), the movement toward the center, made necessary in order to project said fingers through the slots 28 of member 27, is effected by the cooperation of ledge 40 with the bevelled surface 34 of each finger, as indicated in Fig. 3. As will be understood, the end of the right hand movement of rod 7 disposes the clamping fingers 19 in the distended inoperative position shown in Fig. 2, and disposes the centering fingers 10 in the collapsed operative position shown in said figure, in readiness for the impalement thereon of a new workpiece.

Figure 7:
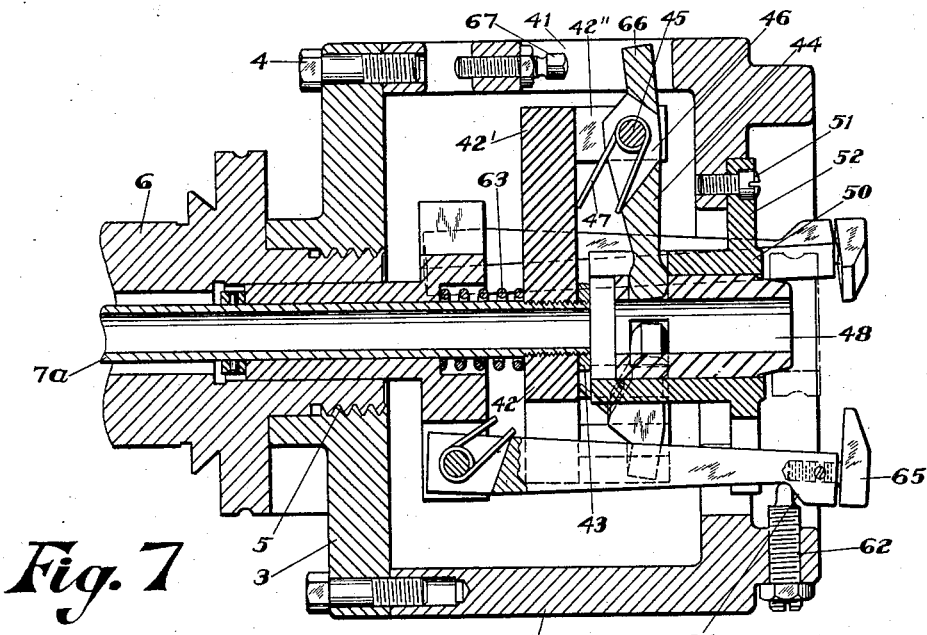
Fig. 7 is a sectional view, showing a modified construction of the chuck or work holding device, in open position.
Figure 8:
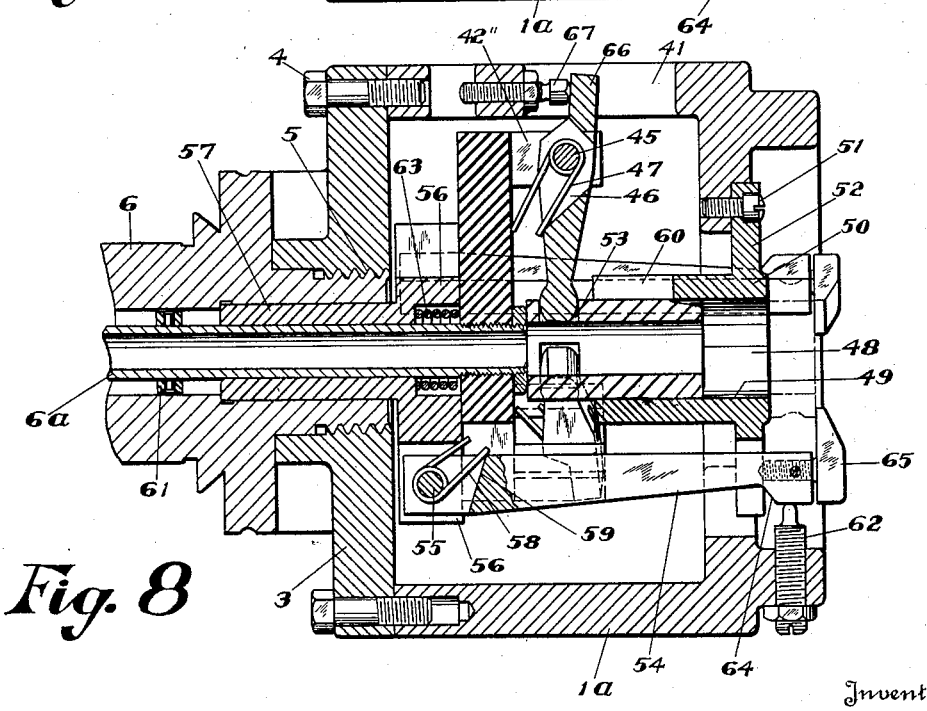
Fig. 8 is a view similar to Fig. 7, showing the chuck in closed position.

In Figs. 7 and 8 is shown a modification of the invention, in which the workpiece is centered on a yielding plug, as will now be set forth.

The mechanism of the chuck of Figs. 7 and 8 is inclosed in a casing 1a, similar to the casing 1, but having longitudinal slots 41 through its otherwise cylindrical shell. Said casing 1a is secured to a plate 3 by means of bolts 4, the plate 3 being in turn secured to the spindle 6, as in the other form of the invention. Inside the spindle 6 is an operating rod 7a which, when moved to the right, opens the chuck, and when moved to the left closes it.

A member 42 has a screw threaded connection with the front end of rod 7a, a check nut 43 serving to hold it rigidly in place. The member 42 has three radial arms 42', each one of which provides a pair of ears 42" for the pivotal attachment of three levers 44 by means of pivot pins 45. The levers 44 are longitudinally slotted at 46, thus leaving a space around the pins 45; coil springs 47 surround these pins 45, said springs having straight extensions bearing, respectively, against the sides of arms 42' and against the end of the slot 46. It will be readily seen that the springs 47 tend to press the inward ends of lever 44 towards the front of the chuck.

The yielding centering plug 48 is a generally cylindrical member with its front end tapered. Its axis coincides exactly with the axis of rotation of the chuck and it is received slidably in the internal cylindrical bore 49 of a member 50, which, like the member 27 of Figs. 1–6, is detachably fastened to the casing 1, as by screws 51 extending through a slotted flange 52 of said member 50. The cylindrical wall of the plug 48 is broken by three recesses 53 near its left hand end, and each of these recesses receives the rounded inner end of one of the three levers 44.

The clamping fingers 54 of the modified form of chuck are mounted on pivot pins 55 in three pairs of ears 56', provided by the forward enlargement 56 of a sleeve 57 which is slidably mounted on the rod 7a. The fingers 54 extend through the aforesaid slots in the flange 52 and are pressed outwardly by means of springs 58, similar to the springs 47, surrounding the pins 55, the extensions of said springs pressing against the enlargement 56 and against the end of slots 59 in the fingers 54.

When the rod 7a is in its extreme right hand position, as shown in Fig. 7, the tapered front end of the plug 48 projects beyond the mouth of the cylindrical surface 49, being held there by the action of the levers 44 under the influence of springs 47. The inward ends of levers 44 pass through slots 60 in the wall of member 50 and engage the ends of said slots. The sleeve 57 and enlargement 56 are held to the right by a collar 61 attached in any suitable way to the rod 7a and the fingers 54 consequently project from the front of the chuck, being distended by the springs 58, and each finger 59 being engaged by an adjustable screw 62.

The operator, finding the chuck in this position, impales a workpiece a on the plug 48 and then causes the rod 7a to be drawn to the left. This action withdraws the collar 61 and the sleeve 57 follows said collar, carrying with it the fingers 54, by reason of a spring 63 interposed between enlargement 56 and the member 42. As the fingers 54 move to the left, cam surfaces 64 on each finger are drawn across the noses of adjustable screws 62, and the fingers are thereby forced together. This brings jaws 65 on said fingers, similar to the jaws 37, into engagement with the workpiece a. This engagement forces the plug 48 to the left against the action of the springs 47; the workpiece finally touches the annular mouth of the member 50 which is rigid, and the workpiece is thus clamped in centered position by the jaws 65.

At the start of the clamping action, but before the spring 63 has become fully compressed, the levers 44 have been carried to the left far enough so that the outward ends 66 of said levers (which are located in the slots 41) engage adjustable screws 67 carried by the shell 1 and located in said slots 41. Up to this time the levers have kept the plug 48 pressing against the workpiece a, the levers 44, swinging counterclockwise as the member 42 retreats, but upon the engagement of the outer ends 66 with the screws 67, the levers 44 are swung quickly in the other direction by reason of the shortness of said outer extensions 66, and this action withdraws the plug 48 well into the bore 49. This withdrawal action is accomplished by a very slight movement of the rod 7a beyond the point where the clamping started, owing to the leverage described, and when the workpiece is fully clamped, the plug 48 is well out of the way of a tool, grinding wheel, or the like, operating in and through the bore of workpiece a. Movement of the rod to the right after the operation on the workpiece has been completed releases said workpiece, and places the plug in position for impalement of a fresh workpiece, and such motion being obvious from the description already given, need not be further described.

I claim,

1. In a chuck, a set of work-centering fingers, each having a pivotal mounting, a set of work-holding fingers, and a single actuating means for both said sets of fingers.

2. In a chuck, a set of interiorly contacting work-centering fingers, each having a pivotal mounting, a set of work-holding fingers, and a single actuating means for both said sets of fingers.

3. In a chuck, a work-centering mechanism, a work-clamping mechanism, means for actuating both said mechanisms, and means for withdrawing said centering mechanism from contact with the work after said clamping mechanism comes into operation.

4. In a chuck, work-centering mechanism, positive means for actuating said work-centering mechanism, work-clamping mechanism, said clamping mechanism being opened by said positive means, and resilient means to actuate said clamping mechanism to cause it to clamp a workpiece, whereby the clamping mechanism may clamp a workpiece in position prior to the disengagement thereof by the centering mechanism.

5. In a chuck, a plurality of work-clamping devices, a member to which all of said devices are pivotally connected, rods in said chuck parallel to the axis thereof, said member being mounted to move axially on said rods, and springs mounted on said rods to press said member in one direction, thus securing an even rectilinear movement of said member without binding.

6. In a chuck, an axially located member, a plurality of work-centering devices pivotally mounted on said member to swing in radial planes, cam surfaces on said devices, a symmetrical member mounted on said first-named member adapted to contact said surfaces, and a spring to press said symmetrical member against the said surfaces.

7. In a chuck, an axially located member, a plurality of work centering devices pivotally mounted on said member to swing in radial planes, cam surfaces on said devices, a symmetrical member mounted on said first-named member adapted to contact said surfaces, a spring to press said symmetrical member against the said surfaces, and a cam to control the movement of said devices in response to the pressure of said spring.

8. In a chuck, a set of work-locating fingers adapted to contact the interior of a workpiece, spring means tending to distend said fingers, means to withdraw said fingers axially into said chuck, and cam means to first hold said fingers together and then to allow them to distend so as to center said work in the withdrawal motion.

9. In a chuck, a set of work-locating fingers adapted to contact the interior of a workpiece, spring means tending to distend said fingers, means holding said fingers close together when in a forward position, whereby to allow impalement of a workpiece, and means to draw said fingers into said chuck away from said holding means, whereby to cause said fingers to center said work.

10. In a chuck, a set of work-locating fingers adapted to contact the interior of a workpiece, spring means tending to distend said fingers, means holding said fingers close together when in a forward position, whereby to allow impalement of a workpiece, means to draw said fingers inwardly from said holding means, to produce initially their distension by said spring means to center the impaled workpiece, and to produce finally their full withdrawal from the workpiece bore, to permit operation in said bore of a tool.

11. In a chuck, a work-centering mechanism, a work clamping mechanism, means for actuating both of said mechanisms, and means for starting the withdrawal of said centering mechanism from contact with the work before said clamping mechanism comes into operation.

12. In a chuck, work-centering means, resilient means to urge said work-centering means into operative position, work-holding means, and an actuating device to move the work-centering means and the work-holding means in unison, to withdraw the former from contact with the work and to engage the latter operatively with the work.

13. In a chuck, a plurality of centering fingers, a plurality of gripping fingers, means for moving said gripping fingers to grip a workpiece, means for moving said centering fingers axially of said chuck, resilient means causing said fingers to spread when so moved, and connections between said means for moving the centering fingers and the means for moving the gripping fingers to bring the gripping fingers into engagement with the workpiece only after the centering fingers have been allowed to spread to center it.

14. In a chuck, work clamping devices, means supporting said devices having an abutment or shoulder, spring means to urge said devices into clamping position, work centering means, actuating means for said work centering means, and an abutment associated with the actuating means for the centering means and adapted to coact with the abutment on the supporting means whereby when the work centering means is in work-centering position the clamping devices are held in inoperative position.

15. In a chuck, work-centering means, work-gripping means, actuating mechanism for both of said means, and connections between them to engage the work-gripping means with a workpiece held in centered position by the work-centering means, and means for thereafter withdrawing said work-centering means from contact with said workpiece.

16. In a chuck, a plurality of centering fingers, each having a pivotal mounting, a plurality of gripping fingers, actuating means for both of said sets of fingers, and connections between them to cause the work-gripping fingers to grip the workpiece while the centering fingers are holding it in centered position.

17. In a chuck, a plurality of centering fingers adapted to contact the interior of a workpiece, resilient means urging certain fingers apart, means for maintaining said fingers, work-contacting portions alway equidistant from the axis of the chuck, work-gripping means, and devices to cause the work-grapping means to grip a workpiece while the centering fingers are resiliently urged apart to center said workpiece.

18. A chuck for centering and holding an annular workpiece, to permit of operations on the bore thereof, said chuck comprising a plurality of fingers overhanging said workpiece and adapted to clamp the same by engagement with the outer face thereof, and centering means engaging said bore, and adapted for withdrawal therefrom in response to the movement of said clamping fingers into operative position.

19. In a chuck for holding an annular workpiece, to permit of operations on the bore thereof, a set of fingers for centering said workpiece by engagement with said bore, means for holding said workpiece in the position determined by said centering fingers, and means for withdrawing said centering fingers from the workpiece bore after said holding means is rendered operative.

Dated this 23rd day of December, 1926.

RICHARD H. JELLICOE.